(12) United States Patent
Kondo et al.

(10) Patent No.: US 7,073,398 B2
(45) Date of Patent: Jul. 11, 2006

(54) APPARATUS FOR DETECTING THE ROTATION ANGLE OF A ROTATIONAL BODY

(75) Inventors: Seiji Kondo, Aichi (JP); Toru Ueno, Aichi (JP); Yasuhiko Futamura, Aichi (JP); Norimasa Sengoku, Aichi (JP); Mikihisa Araki, Aichi (JP); Yousuke Obata, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 101 days.

(21) Appl. No.: 10/771,037

(22) Filed: Feb. 3, 2004

(65) Prior Publication Data

US 2004/0154410 A1 Aug. 12, 2004

(30) Foreign Application Priority Data

Feb. 4, 2003 (JP) ............................ 2003/026924

(51) Int. Cl.
*G01L 3/02* (2006.01)
(52) U.S. Cl. ................................. 73/862.326
(58) Field of Classification Search ........... 73/862.331, 73/862.333, 862.334, 862.326
See application file for complete search history.

(56) References Cited

U.S. PATENT DOCUMENTS

| | | | | |
|---|---|---|---|---|
| 4,594,621 A | * | 6/1986 | Noguchi et al. | 360/77.15 |
| 4,779,094 A | * | 10/1988 | Lee et al. | 340/870.37 |
| 5,019,981 A | | 5/1991 | Oshita et al. | |
| 5,041,829 A | * | 8/1991 | Garrett | 341/13 |
| 5,930,905 A | * | 8/1999 | Zabler et al. | 33/1 PT |
| 6,848,187 B1 | * | 2/2005 | Ito et al. | 33/1 PT |
| 2002/0111763 A1 | | 8/2002 | Koga | |
| 2003/0177649 A1 | * | 9/2003 | Ito et al. | 33/1 PT |

FOREIGN PATENT DOCUMENTS

| | | |
|---|---|---|
| EP | 1 167 927 A1 | 1/2002 |
| JP | 2000-46536 A | 2/2000 |
| JP | 2001-505667 A | 4/2001 |
| JP | 2002-98522 A | 4/2002 |
| JP | 2002-213944 A | 7/2002 |

\* cited by examiner

*Primary Examiner*—Max Noori
(74) *Attorney, Agent, or Firm*—Crompton, Seager & Tuffe, LLC

(57) ABSTRACT

A rotation angle detection apparatus for reducing power consumption. A magnetoresistance element generates first and second analog signals, which change cyclically and continuously each time a steering shaft is rotated by 60 degrees. A microcomputer determines the rotation angle of the steering shaft from the output value and number of cycles of the analog signals.

13 Claims, 10 Drawing Sheets

APPARATUS FOR DETECTING THE ROTATION ANGLE OF A ROTATIONAL BODY

BACKGROUND OF THE INVENTION

The present invention relates to a rotation angle detection apparatus for detecting the steering angle of a steering wheel in, for example, a vehicle.

In automobiles having electronic control suspension systems and vehicle traveling control systems, known as vehicle stability control (VSC) systems and electronic stability program (ESP) systems, a rotation angle detection apparatus is incorporated in the steering column so as to detect the steering angle of the steering wheel. Known types of rotation angle detection apparatuses include those that detect the absolute angle and others that detect a relative angle.

Japanese Laid-Open Patent Publication No. 2002-98522 describes a conventional rotation angle detection apparatus that detects the absolute angle. The rotation angle detection apparatus is provided with a rotation plate, three photosensors for detecting angles during one rotation of the rotation plate, and a single magnetoresistance element for detecting the number of rotations of the rotation plate. Specifically, three slits having mutually different patterns are provided at three locations in the circumferential direction of the rotation plate. Three photosensors are arranged at positions corresponding to the three slits. Each photosensor outputs a detection signal in accordance with whether or not a slit is at the associated position. Three-bit codes of the detection signals output from the three photosensors are determined so as to not be repeated during a single rotation of the rotation plate. The rotation angle (absolute value) of the rotation plate is determined based on the three-bit codes.

In this type of rotation angle detection apparatus, the rotation angle of the rotation plate is detected as an absolute value. Thus, even if the detection apparatus stops functioning when the rotation plate is rotated, the absolute value of the rotation plate is detectable when the apparatus starts functioning again. However, a rotation angle detection apparatus that detects the absolute angle has a shortcoming in that many devices are required for angle detection and in that it is difficult to design the pattern of the slits on the rotation plate.

Japanese Laid-Open Patent Publication No. 2000-46536 describes a conventional rotation angle detection apparatus that detects the relative angle. The rotation angle detection apparatus is provided with a rotation plate having a plurality of equally spaced slits and three photosensors for detecting the rotation angle of the rotation plate. Each photosensor outputs a reflected binary code in accordance with whether or not a slit is at an associated position. The rotation angle detection apparatus relatively calculates the rotation angle of the rotation plate by adding or subtracting the number of changes of the reflected binary code output from each photosensor from the angle data that is used as a criterion.

In the rotation angle detection apparatus that detects the relative angle detecting type, the rotation angle of the rotation plate may be detected by using two photosensors, and simple slits are provided on the rotation plate. This facilitates the designing of the slit pattern.

In a rotation angle detection apparatus that detects the relative angle, if the detection apparatus stops functioning when the rotation plate is rotated, the rotation angle of the rotation plate immediately prior to the stopping may differ from the actual rotation angle of the rotation plate when the detection apparatus starts to function again. Therefore, the rotation angle detection apparatus must continuously detect the rotation angle of the rotation plate even when the automobile ignition is turned OFF. However, when the rotation angle detection apparatus is operated continuously in a state in which the vehicle ignition is turned OFF, there is concern with drain of the battery due to large dark current. Thus, when the ignition is turned OFF, the rotation angle detection apparatus is intermittently operated. This reduces the power consumption of the rotation angle detection apparatus and prevents the rotation angle of the rotation plate from being erroneously detected.

Specifically, in the rotation angle detection apparatus of Japanese Laid-Open Patent Application No. 2000-46536, the resolution is 1.5 degrees, and the output phase differential of the photosensor is 1.5 degrees. Therefore, the cycle during which the rotation angle detection apparatus is intermittently operated (sampling cycle) must be set at a time interval which is at least shorter than the time required for the rotation plate to rotate 1.5 degrees. For example, when the maximum tolerable rotation speed of the rotation plate is two rotations per second (720 degrees per second), the required sampling cycle is approximately one millisecond or less.

In recent years, however, the requirement to reduce dark current has become more severe in conjunction with the move to vehicle electronic controls and the increase in built-in battery powered devices, as well as the requirement for reducing the power consumption of the rotation angle detection apparatus when the ignition is turned OFF.

SUMMARY OF THE INVENTION

It is an object of the present invention to provide a rotation angle detection apparatus having reduced power consumption.

To achieve the above object, the present invention is an apparatus for detecting the rotation angle of a rotational body. The rotational body including an angle detecting element for generating an angle detection analog signal having an output value that cyclically and continuously changes in accordance with the rotation angle of the rotational body. One cycle of the angle detection analog signal is associated with a predetermined degree of rotation of the rotational body. An angle determining unit is connected to the angle detecting element to determine the rotation angle of the rotational body based on the output value and a number of cycles of the angle detection analog signal.

A further aspect of the present invention is an apparatus for detecting the rotation angle of a rotational body. The apparatus has a rotation plate rotated together with the rotational body and including a gear. A first gear body is meshed with the gear of the rotation plate and rotated in conjunction with the rotation of the rotation plate. The first gear body has a number of teeth that is determined such that the first gear body is rotated a predetermined natural number of times during a single rotation of the rotation plate. A magnetoresistance element generates an angle detection analog signal having an output value that changes cyclically in accordance with the rotation angle of the first gear body. A microcomputer detects the number of rotations of the first gear body from the cyclic change in the angle detection analog signal, detects the rotation angle of the first gear body from the output value, and determines the rotation angle of the rotational body from the rotation angle and the number of rotations of the first gear body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A rotation angle detection apparatus according to a first embodiment of the present invention will now be described.

Figure 1:
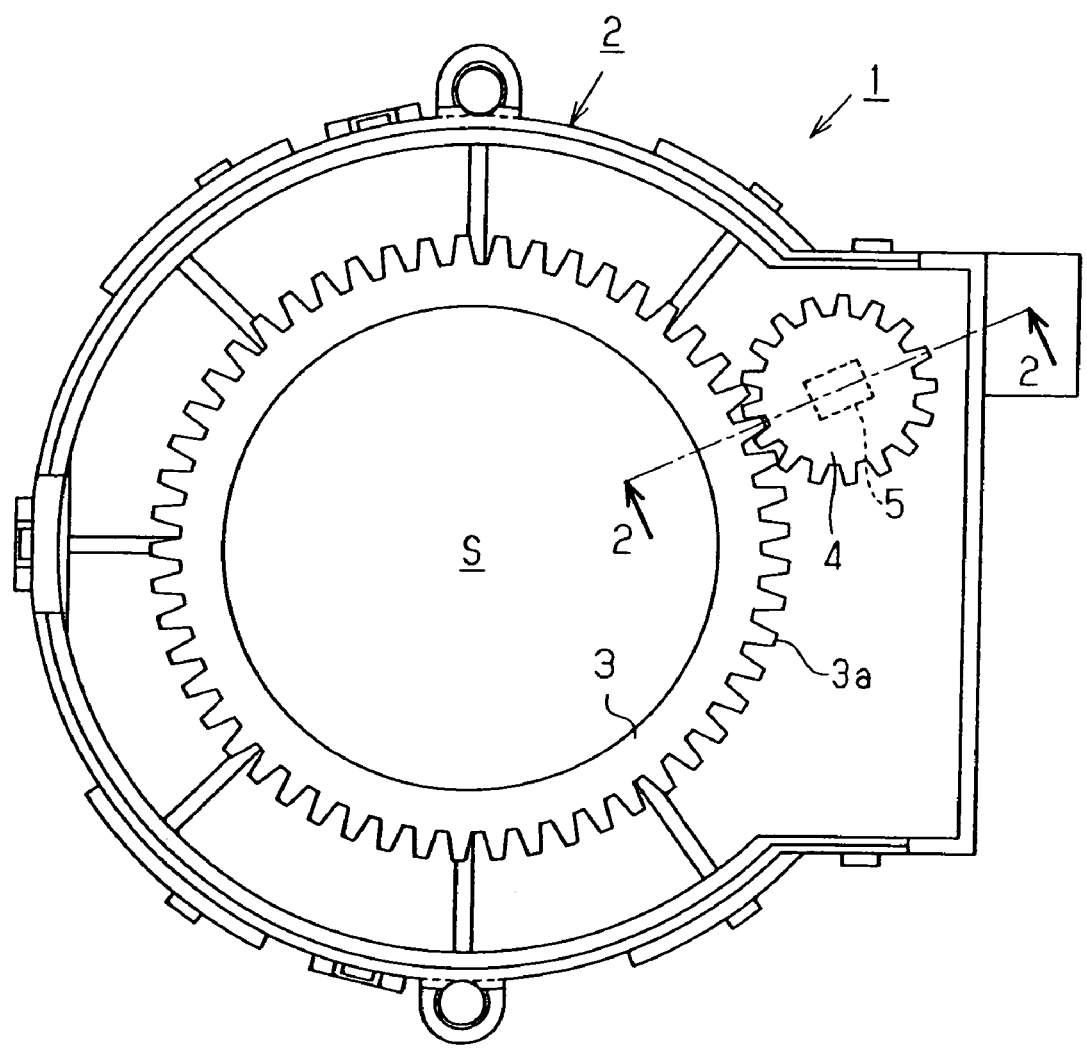
FIG. 1 is a plan view schematically showing a steering angle detection apparatus according to a first embodiment of the present invention.

As shown in FIG. 1, the rotation angle detection apparatus, that is, a steering angle detection apparatus 1 for detecting the steering angle of the steering wheel of a vehicle is installed on a steering shaft S, which serves as a rotational body, in the steering column of the vehicle (not shown). The steering angle detection apparatus 1 has a housing 2 fixed to a structural body attached on the circumference of the steering shaft S. A rotation plate 3 fitted to the steering shaft S is arranged in the housing 2. Accordingly, the rotation plate 3 rotates together with the steering shaft S. The rotation plate 3 has an external surface formed as a gear 3a.

A gear body 4, which engages the gear 3a, is arranged adjacent to the rotation plate 3. The gear body 4 rotates in conjunction with the rotation of the rotation plate 3, that is, the rotation of the steering shaft S. The number of teeth of the gear body 4 and the gear 3a is determined such that the gear body 4 rotates six times when the rotation plate 3 rotates once (the tooth ratio of the gear body 4 and the rotation plate 3 is 1:6).

A permanent magnet 5 is fixed to the center of the gear body 4. The permanent magnet 5 generates a magnetic flux in a predetermined radial direction of the gear body 4. Therefore, in one rotation of the gear body 4, the direction of the magnetic flux generated by the permanent magnet 5 also rotates 360 degrees.

Figure 2:
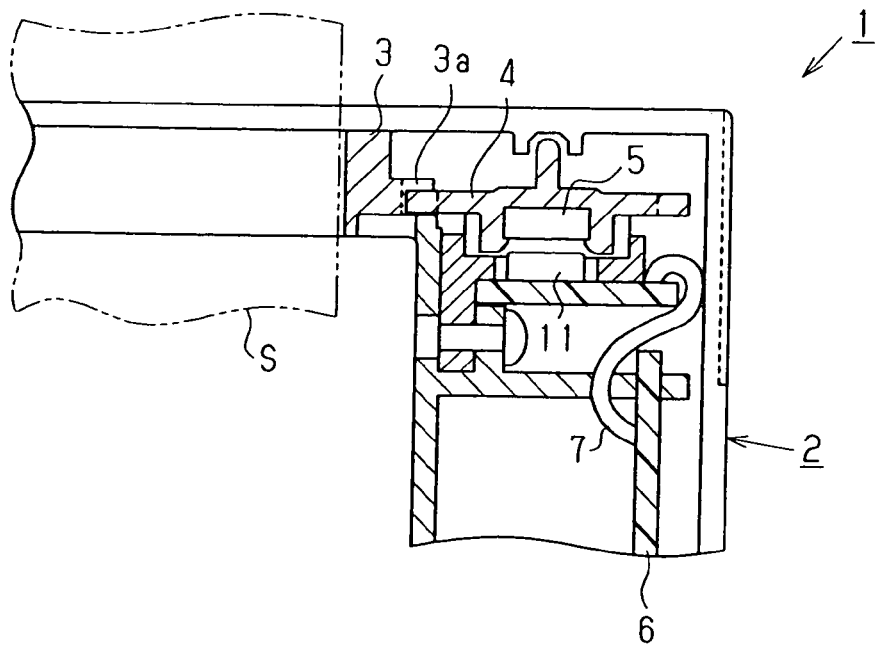
FIG. 2 is a partial cross sectional view taken along line 2—2 in FIG. 1.
Figure 4:
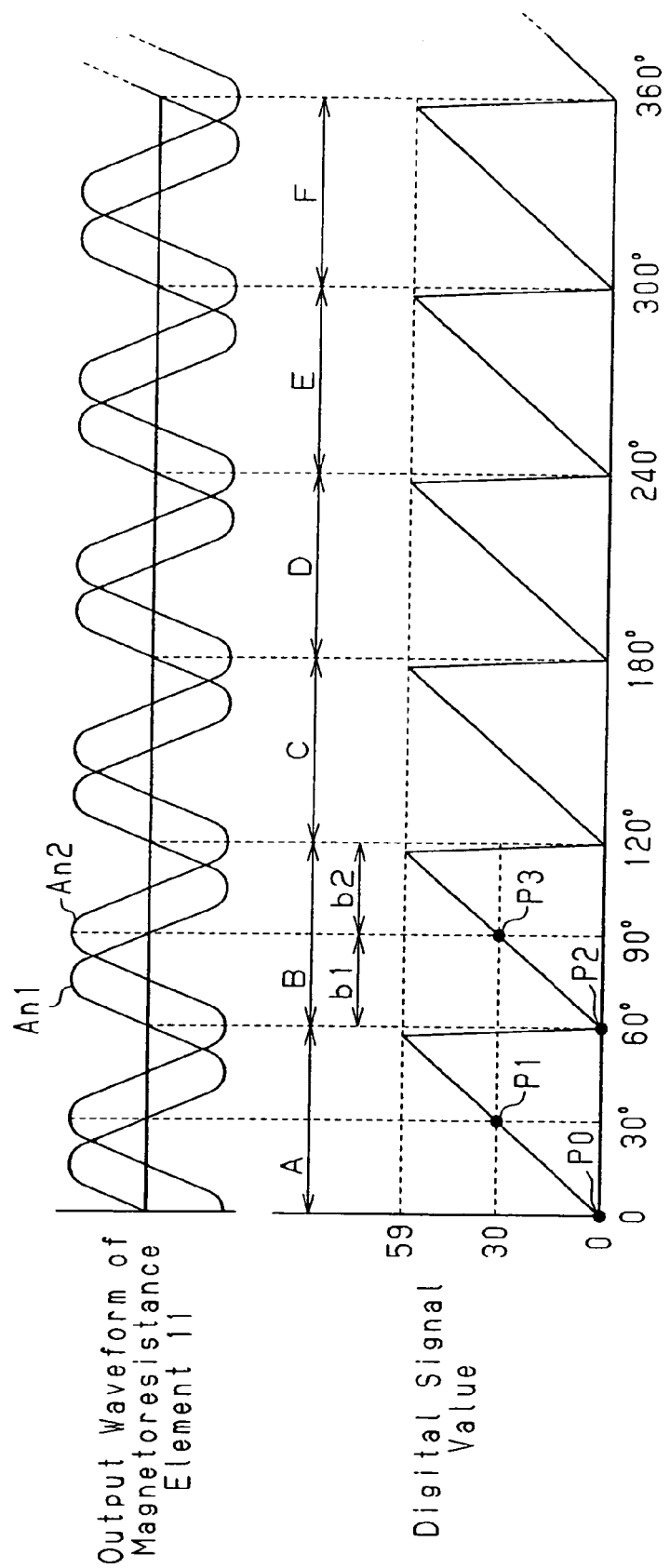
FIG. 4 is a graph showing the detection signal and detection angle of the steering angle detection apparatus of FIG. 1.

As shown in FIG. 2, a magnetoresistance element 11, which serves as an angle detecting element, is located under the permanent magnet 5 facing towards the permanent magnet 5 in the housing 2. The magnetoresistance element 11 detects the magnetic flux of the permanent magnet 5, and generates an angle detection analog signal having an output value which changes continuously and cyclically in accordance with the rotation angle of the gear body 4. Specifically, since the gear body 4 performs one rotation (360 degrees) each time the rotation plate rotates 60 degrees, the magnetoresistance element 11 generates an angle detection analog signal, which includes a first analog signal An1 and second analog signal An2, as shown in FIG. 4. The first analog signal An1 and the second analog signal An2 are sine waves with each cycle completed when the rotation plate 3 is rotated by 60 degrees. The phase of the second analog signal An2 is shifted ¼ of a cycle relative to the phase of the first analog signal An1.

The electrical circuits of the steering angle detection apparatus 1 will now be described.

Figure 3:
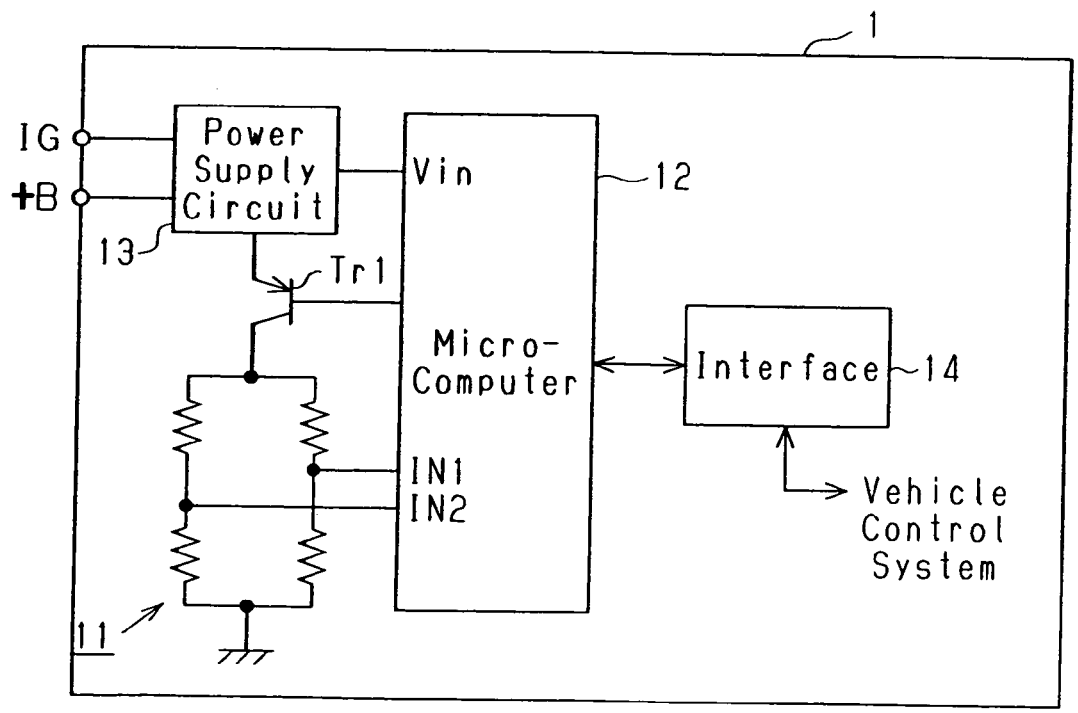
FIG. 3 is a block diagram of the steering angle detection apparatus of FIG. 1.

As shown in FIG. 3, the steering angle detection apparatus 1 includes a magnetoresistance element 11, a microcomputer 12, which serves as an angle determining unit, a power supply circuit 13, and an interface 14.

The microcomputer 12 includes a CPU, ROM, RAM, and an A/D converter (not shown) and is arranged on a printed circuit board 6 shown in FIG. 2. The first and second analog signals An1 and An2 from the magnetoresistance element 11 are input to a first input terminal IN1 and a second input terminal IN2 of the microcomputer 12. Specifically, the first analog signal An1 is input to the first input terminal IN1 and the second analog signal An2 is input to the second input terminal IN2 through a signal line 7, which is shown in FIG. 2.

The power supply circuit 13 supplies power to a power input terminal Vin of the microcomputer 12. The power supply circuit 13 includes a DC-DC converter for reducing the battery voltage and converting it to drive voltage for the microcomputer 12. The battery voltage (IG) is input to one of the input terminals of the power supply circuit 13 through an ignition ON relay (not shown), and a battery voltage (+B) is input to the other one of the input terminals bypassing the ignition ON relay.

The power supply circuit 13 is electrically connected to the magnetoresistance element 11 through a transistor Tr1, which functions as a switching device. Specifically, the collector terminal of the transistor Tr1 is connected to the power supply circuit 13, and the emitter terminal is connected to the magnetoresistance element 11. The base terminal of the transistor Tr1 is connected to the microcomputer 12. When the base current flows from the microcomputer 12 to the transistor Tr1, the transistor Tr1 is turned ON, and power is supplied from the power supply circuit 13 to the magnetoresistance element 11. Therefore, the supply of power to the magnetoresistance element 11 is controlled by the microcomputer 12, and the magnetoresistance element 11 generates the first and second analog signals An1 and An2 supplied with power.

When first and second analog signals An1 and An2 are received from the magnetoresistance element 11, the microcomputer 12 determines the rotation angle of the rotation plate 3 based on the voltage values of the analog signals An1 and An2. Specifically, the microcomputer 12 converts the first and second analog signals An1 and An2 to a digital signal (refer to FIG. 4). The cycle of each of the analog signals An1 and An2 are divided into 60 sections. The digital signal has a digital signal value (0 to 59) for each of the 60 divided sections. One cycle of the digital signal is equivalent to one rotation of the gear body 4, and one digital signal value corresponds to an angle of one degree of the steering shaft S. Therefore, the resolution of the steering angle detection apparatus 1 is one degree.

For example, at point P0 where the rotation plate 3 is at a reference position (0 degrees at which the vehicle wheels are oriented straight in the direction of travel), the analog signals An1 and An2 are converted to a digital signal of value "0". At the moment (point P1) at which the rotation plate 3 has rotated 30 degrees in the clockwise direction, the analog signals An1 and An2 are converted to a digital signal of value "30". That is, when the rotation plate 3 rotates from 0 degrees to 59 degrees, the digital signal value is incremented by "1" whenever the rotation plate 3 is rotated by one degree in the clockwise direction. Likewise, the digital signal value is decremented by "1" whenever the rotation plate 3 is rotated by one degree in the counterclockwise direction. Furthermore, since the voltage value of each analog signal An1 and An2 is equal to the voltage value at the reference position when the rotation plate 3 has rotated 60 degrees, the digital signal value again becomes "0", as shown at point P2.

Then, the microcomputer 12 determines the rotation angle of the rotation plate 3 based on the digital signal value. For example, when the digital signal value is "30" (point P1) in range A (the change in the analog signals An1 and An2 being within one cycle from the reference position), the microcomputer 12 calculates the rotation angle of the rotation plate 3 as being "30 degrees" (in the clockwise direction), as shown in FIG. 4. Furthermore, when the digital signal value is "30" (point P3) in range B (the change in the analog signals An1 and An2 being between one cycle and two cycles from the reference position), the microcomputer 12 calculates the rotation angle of the rotation plate 3 as "90 degrees" (in the clockwise direction). That is, the microcomputer 12 determines the rotation range (ranges A–F) from the reference position based on which cycle the change in the analog signals An1 and An2 is in from the reference position, and determines the absolute value of the rotation angle of the rotation plate 3 based on the digital signal value in that rotation range. That is, the microcomputer 12 counts the number of cycles of the analog signals An1 and An2 from the reference position, and relatively determines the rotation range (number of rotations) of the rotation plate 3 based on the count value. Then, the microcomputer 12 determines the rotation angle of the rotation plate 3 based on the determined rotation range and the voltage values from the analog signals An1 and An2. The microcomputer 12 provides the determined rotation angle to various vehicle control systems (e.g., a vehicle stability control system and an electronic suspension control system) through the interface 14.

Furthermore, the microcomputer 12 checks whether or not the battery voltage (IG) is supplied to the power supply circuit 13 through the ignition ON relay. When the battery voltage (IG) is supplied through the ignition ON relay, the microcomputer 12 continuously operates the transistor Tr1. In this way, the magnetoresistance element 11 operates continuously thus providing the first and second analog signals An1 and An2 to the microcomputer 12, and the microcomputer 12 continuously calculates the rotation angle of the rotation plate 3 based on the analog signals An1 and An2.

When the battery voltage (IG) is not supplied to the power supply circuit 13 through the ignition ON relay, that is, when the vehicle engine is stopped, the microcomputer 12 intermittently operates the transistor Tr1. Specifically, the microcomputer 12 intermittently operates the transistor Tr1 with a timing (sampling cycle) in which the magnetoresistance element 11 is operated only once during a period in which the rotation angle of the rotation plate 3 changes 30 degrees when the rotation plate 3 is rotated at a maximum rotation speed, which is set beforehand (five rotations per second in the first embodiment). Accordingly, when the engine is in the stopped state, the microcomputer 12 calculates the rotation angle of the rotation plate 3 so that a single sampling cycle corresponds to the period during which the first and second analog signals An1 and An2 change a half cycle when the rotation plate 3 is rotated at a maximum rotation speed.

Therefore, for example, if the engine stops when the rotation plate 3 is at the position indicated by point P3 (the rotation angle of 90 degrees) and thereafter the steering shaft S and the rotation plate 3 are rotated, then, even when the rotation is at the maximum rotation speed, the rotation angle is calculated as being within range b1 or within range b2 of FIG. 4. In this way, the microcomputer 12 detects whether the rotation plate 3 has rotated in the clockwise direction or in the counterclockwise direction from the change in the digital signal value.

The sampling cycle of the magnetoresistance element 11 is determined by the following equation.

(Sampling cycle)<(Tolerable rotation angle per one sampling cycle)÷(Maximum rotation angle per second)

In the first embodiment, since the tolerable rotation angle per one sampling cycle is 30 degrees, and the maximum rotation angle per second is 1800 degrees, the sampling cycle may be set at approximately 16 milliseconds.

In comparison, when a conventional rotation angle detection apparatus that detects the relative angle has a resolution of one degree and a maximum rotation speed of five rotations per second, from "(sampling cycle)<1÷1800)", the expression of "(sampling cycle)<0.0005 seconds" is obtained, and the sampling cycle must be set at approximately "0.5 milliseconds". Therefore, the steering angle detection apparatus 1 of the first embodiment can have a sampling cycle that is about 30 times longer than that of the conventional rotation angle detection apparatus that detects the relative angle.

The first embodiment has the advantages described below.

(1) The microcomputer 12 calculates how many times the rotation plate 3, or the steering shaft S, has rotated a predetermined angle (in this case, 60 degrees) by counting the number of elapsed cycles of the first and second analog signals An1 and An2, which are provided by the magnetoresistance element 11, from the reference position. Furthermore, the microcomputer 12 calculates the absolute angle within a predetermined angle (60 degrees) based on the output values of the first and second analog signals An1 and An2. That is, the approximate rotation angle (range of rotation angle) of the steering shaft S is calculated based on the number of cycles of the first and second analog signals An1 and An2. The precise rotation angle of the steering shaft S is calculated based on the output values of the analog signals An1 and An2. In this way, the absolute angle is detected during the period in which the steering shaft S is rotated a predetermined angle (60 degrees). Thus, the microcomputer 12 does not generate an erroneous rotation angle detection even when rotation angle detection sampling is not performed until the steering shaft S reaches 60 degrees. This enables the cycle for angle detection sampling (sampling cycle) to be lengthened when the engine is stopped and reduces power consumption of the steering angle detection apparatus.

(2) When the engine is stopped (the steering angle detection apparatus 1 is non-activated), the rotation angle of the steering shaft S is calculated at least twice before the steering shaft S rotates a predetermined angle (60 degrees) even when the steering shaft S is rotated at a predetermined maximum rotation speed (five rotations per second). Therefore, the microcomputer 12 accurately recognizes whether or not the steering shaft S has rotated in the clockwise direction or rotated in the counterclockwise direction. This prevents the rotation angle of the steering shaft S from being erroneously detected.

(3) A single magnetoresistance element 11 is used as the angle detecting element. This reduces the number of parts compared to conventional rotation angle detection apparatuses that detect the relative angle and simplifies the structure of the steering angle detection apparatus 1.

A steering angle detection apparatus 1 according to a second embodiment of the present invention will now be described below with reference to FIGS. 5 through 7. In each of the following embodiments, only those aspects which differ from the first embodiment are described. Further, like parts are designated by like reference numbers and are not described.

Figure 5:
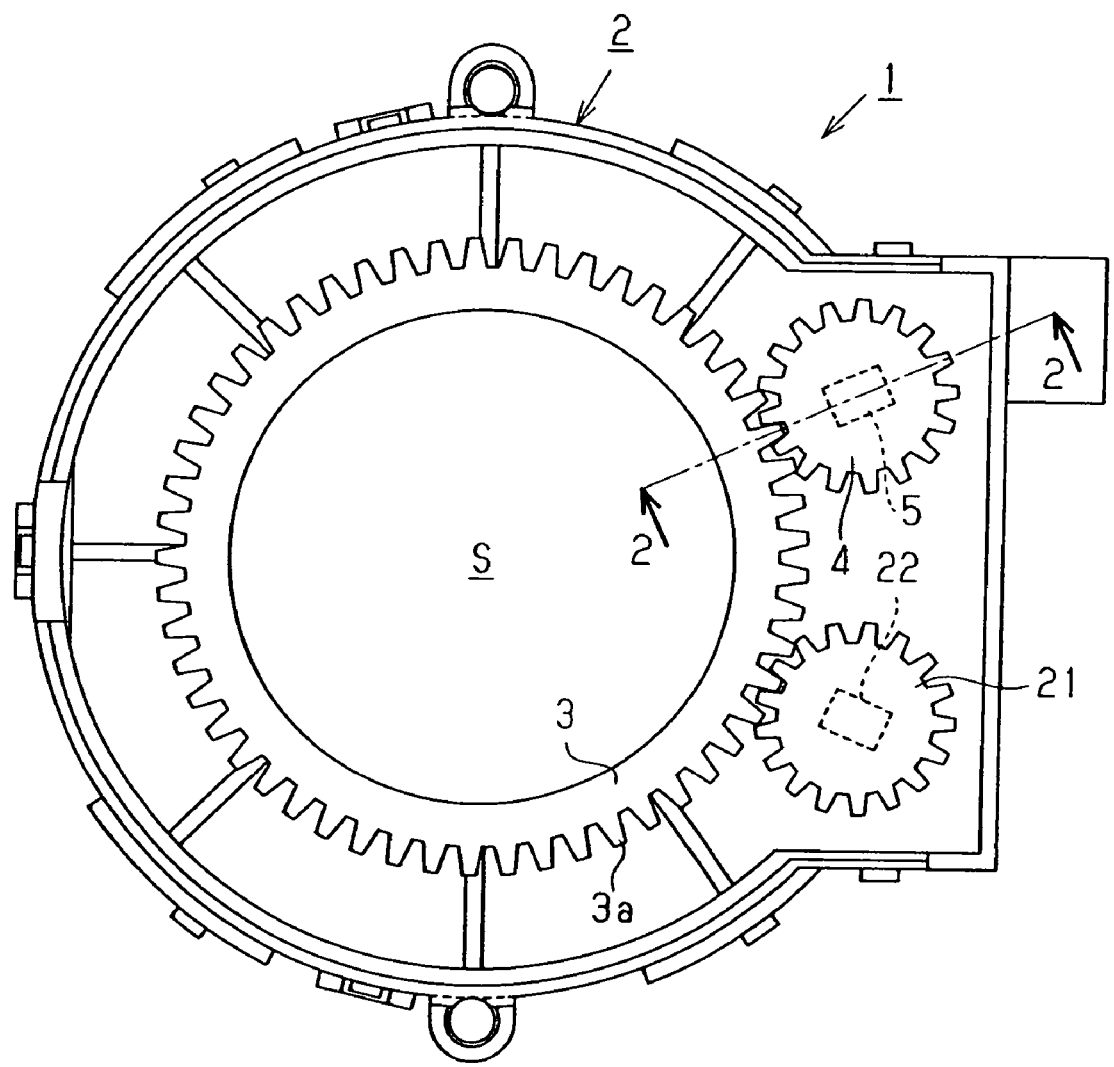
FIG. 5 is a plan view schematically showing a steering angle detection apparatus according to a second embodiment of the present invention.

As shown in FIG. 5, the steering angle detection apparatus 1 of the second embodiment includes an abnormality detection gear 21, which is meshed with the gear 3a of the rotation plate 3. When the steering shaft S rotates, the gear body 4 and abnormality detection gear 21 both rotate in conjunction with the rotation of the rotation plate 3. The number of teeth of the rotation plate 3 and the abnormality detection gear 21 are determined such that the abnormality detection gear 21 rotates six times when the rotation plate 3 rotates once (the tooth ratio of the abnormality detection gear 21 to the rotation plate 3 is 1:6). Accordingly, the number of teeth of the abnormality detection gear 21 is equal to the number of teeth of the gear body 4, such that when the gear body 4 rotates once, the abnormality detection gear 21 also rotates once.

A permanent magnet 22 is fixed to the center of the abnormality detection gear 21 in the same manner as the gear body 4. The permanent magnet 22 generates a magnetic flux in a predetermined radial direction of the abnormality detection gear 21. Therefore, when the abnormality detection gear 21 rotates once, the direction of the magnetic flux generated by the permanent magnet 22 also rotates 360 degrees.

An abnormality detection magnetoresistance element (abnormality detection MRE) 23 (refer to FIG. 6), which serves as an abnormality detection element, is arranged under the permanent magnet 22 facing towards the permanent magnet 22 in the housing 2. The abnormality detection MRE 23 is formed by an element equivalent to that of the magnetoresistance element 11 (hereinafter referred to as angle detection MRE 1"). The abnormality detection MRE 23 detects the magnetic flux generated by the permanent magnet 22 and generates an analog signal, which is used to detect an abnormality and which has an output value that changes continuously and cyclically in accordance with the rotation angle of the abnormality detection gear 21. Specifically, as shown in FIG. 7, the abnormality detection MRE 23 generates a third analog signal An3, which forms a sine wave with each cycle completed when the rotation plate 3 rotates 60 degrees, and a fourth analog signal An4, which forms a sine wave with a phase shifted by ¼ of a cycle from the third analog signal An3. The third analog signal An3 is set so as to have the same phase as the first analog signal An1, and the fourth analog signal An4 is set so as to have the same phase as the second analog signal An2. That is, the permanent magnet 22 and the abnormality detection MRE 23 are arranged so as to generate the third and fourth analog signals An3 and An4 having the same phases as the first and second analog signals An1 and An2, respectively.

Figure 6:
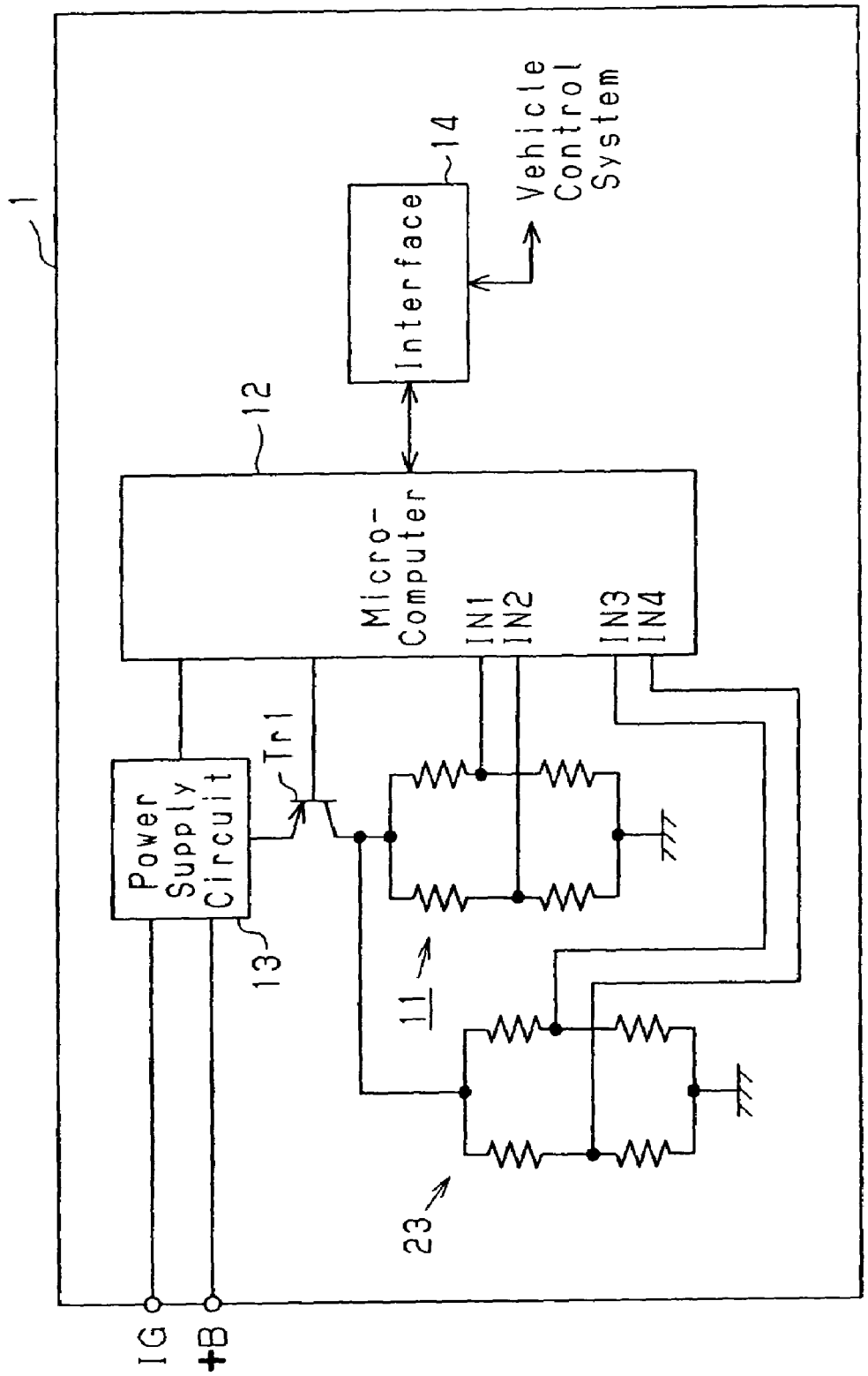
FIG. 6 is a block diagram of the steering angle detection apparatus of FIG. 5.

As shown in FIG. 6, the third analog signal An3 is input to a third input terminal IN3 of the microcomputer 12, and the fourth analog signal An4 is input to a fourth input terminal IN4 of the microcomputer 12. When the first through fourth analog signals An1 through An4 are received, the microcomputer 12 calculates the rotation angle of the rotation plate 3 based on the voltage values of the analog signals An1 through An4.

Figure 7:
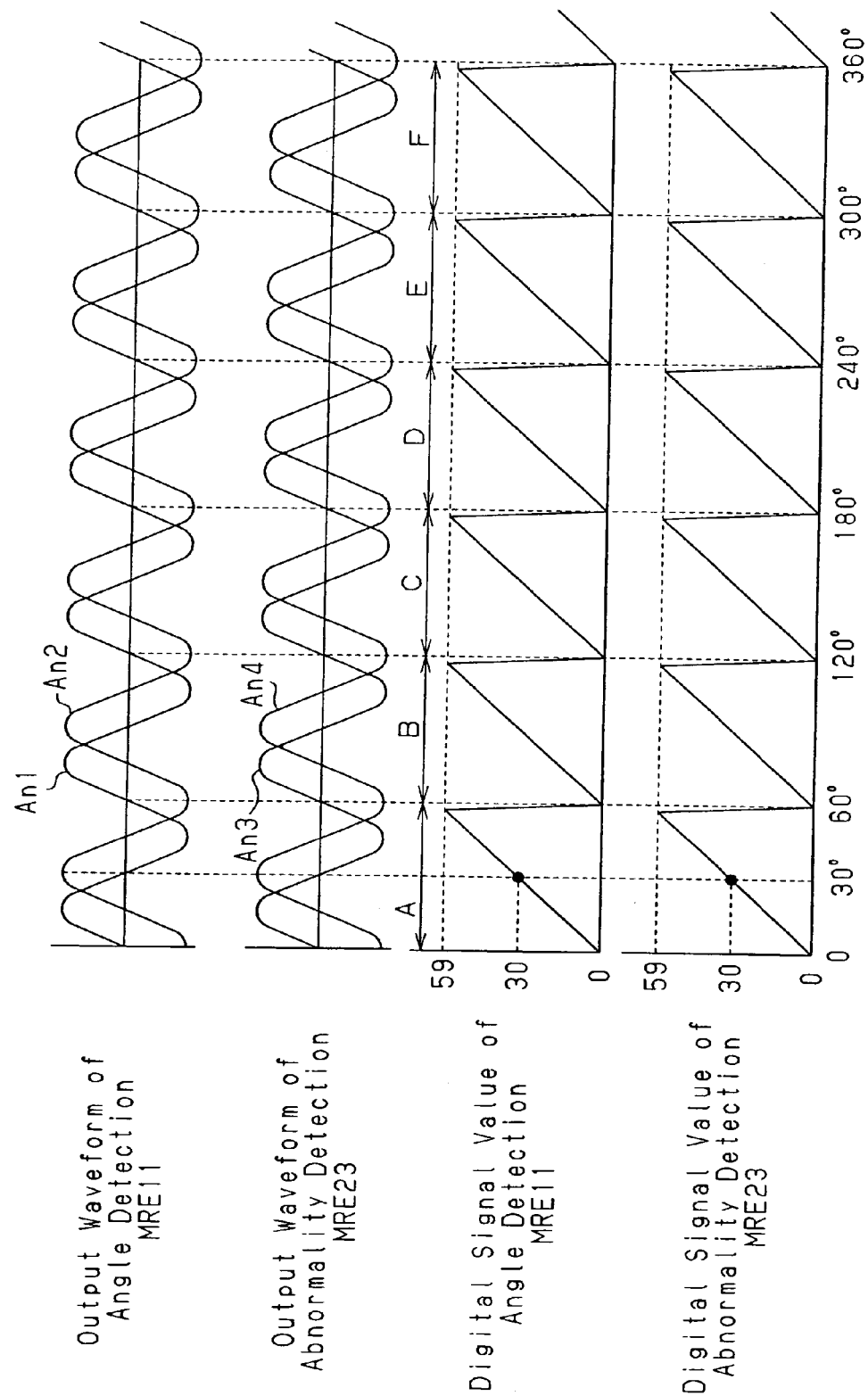
FIG. 7 is a graph showing the detection signal and detection angle of the steering angle detection apparatus of FIG. 5.

Specifically, as shown in FIG. 7, the microcomputer 12 converts the first and second analog signals An1 and An2 to a digital signal in the same manner as in the first embodiment. The microcomputer 12 also converts the third and fourth analog signals An3 and An4 to a digital signal. Then, the microcomputer 12 compares the corresponding values of the digital signals (digital signal values) and determines whether or not the relationship of the corresponding values is normal. That is, in the second embodiment, the first and second analog signals An1 and An2 respectively have the same phases and cycles as the third and fourth analog signals An3 and An4. Thus, the microcomputer 12 checks whether or not the corresponding digital signal values match. When the corresponding digital signal values mutually match, the microcomputer 12 determines that the angle detection MRE 11 and the abnormality detection MRE 23 are normal. Then, the microcomputer 12 calculates the rotation angle of the rotation plate 3.

For example, both digital signal values are "30" and match at the moment the rotation plate 3 has rotated 30 degrees in the clockwise direction from the reference position (point P11). Therefore, the microcomputer 12 calculates the rotation angle of the rotation plate 3 based on the digital signal value "30" under the condition that both digital signal values match. The procedure for calculating the rotation angle of the rotation plate 3 is identical to that of the first embodiment. The "matching" of the digital signal values may also be "approximate." This tolerates small errors in the digital signal caused by noise and the like superimposing the analog signals An1 through An4, as well as the tolerable margin of error of the angle detection MRE 11 and the abnormality detection MRE 23. When these small errors are generated, the microcomputer 12 calculates the rotation angle based on the digital signal value of the first and second analog signals An1 and An2.

The first and second analog signal An1 and An2 are equivalent to "angle detection analog signals," and the third and fourth analog signals An3 and An4 are equivalent to "abnormality detection analog signals."

When the relationship of the values of the corresponding digital signals is abnormal, that is, when the two digital signal values do not match, the microcomputer 12 determines that there is an abnormality in the angle detection MRE 11 or the abnormality detection MRE 23. In such a case, the microcomputer 12 activates an abnormality warning device (not shown), such as a lamp, a buzzer or the like arranged on the instrument panel of the vehicle, so as to warn the occupants of the vehicle of the abnormality. Furthermore, the microcomputer 12 stops or interrupts the control of the vehicle control systems that use the rotation angle of the steering shaft S.

In addition to advantages (1) through (3) of the first embodiment, the second embodiment has the advantages described below.

(4) When the angle detection MRE 11 or the abnormality detection MRE 23 has an abnormality, the digital signal value generated from the first and second analog signals An1 and An2 and the digital signal generated from the analog signals An3 and An4 do not match each other or are not approximate to each other. Therefore, abnormal functioning of the angle detection MRE 11 and the abnormality detection MRE 23 is detected by comparing the digital signal values. This improves the reliability of the steering angle detection apparatus 1.

(5) The abnormality detection MRE 23 is arranged to output the third and fourth analog signals An3 and An4 with the same phase and the same cycle as the first and second analog signals An1 and An2 output from the angle detection MRE 11. Therefore, the digital signal value generated by the first and second analog signals An1 and An2 matches the digital signal value generated by the third and fourth analog signals An3 and An4. Thus, the microcomputer 12 detects abnormality of the angle detection MRE 11 and the abnormality detection MRE 23 by determining whether or not the two corresponding digital signal values match. That is, the process for determining abnormal detection performed by the microcomputer 12 is simplified.

A steering angle detection apparatus 1 according to a third embodiment of the present invention will now be described with reference to FIGS. 8 through 12.

Figure 8:
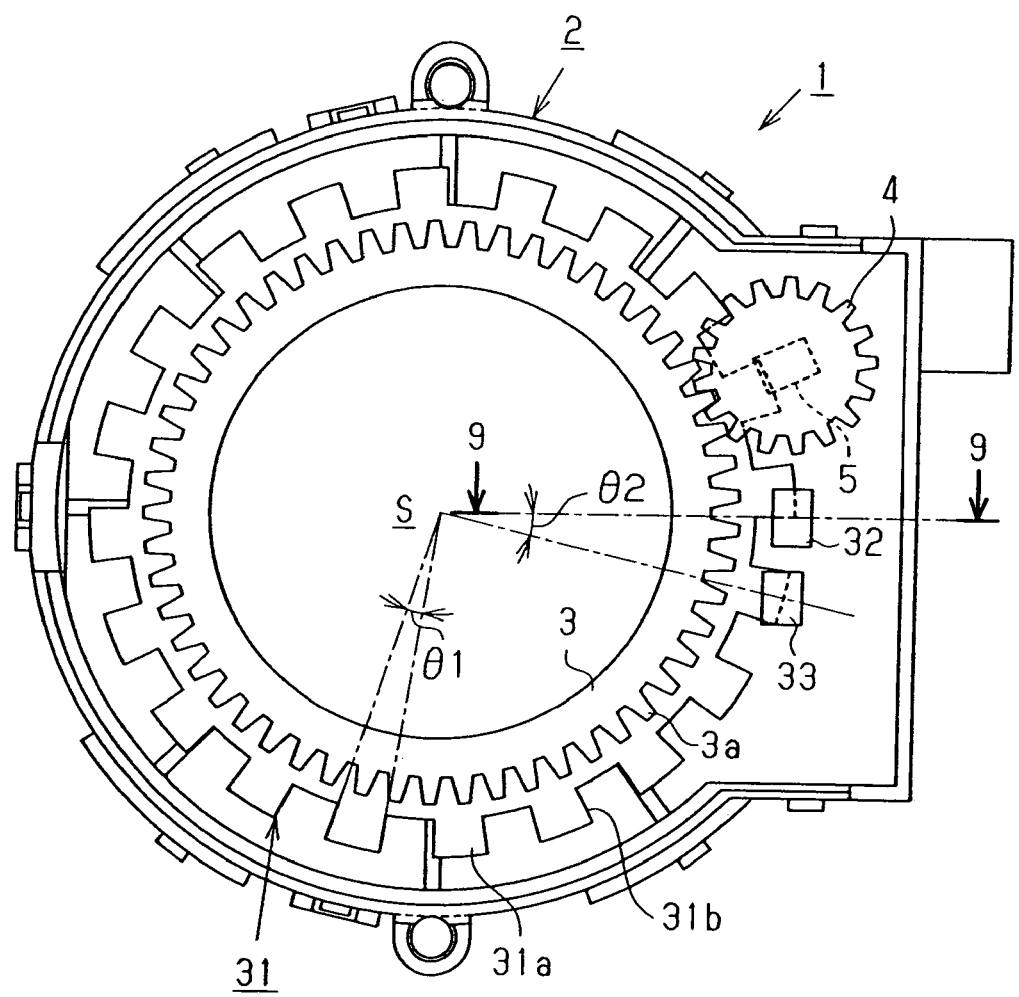
FIG. 8 is a plan view schematically showing a steering angle detection apparatus according to a third embodiment of the present invention.
Figure 9:
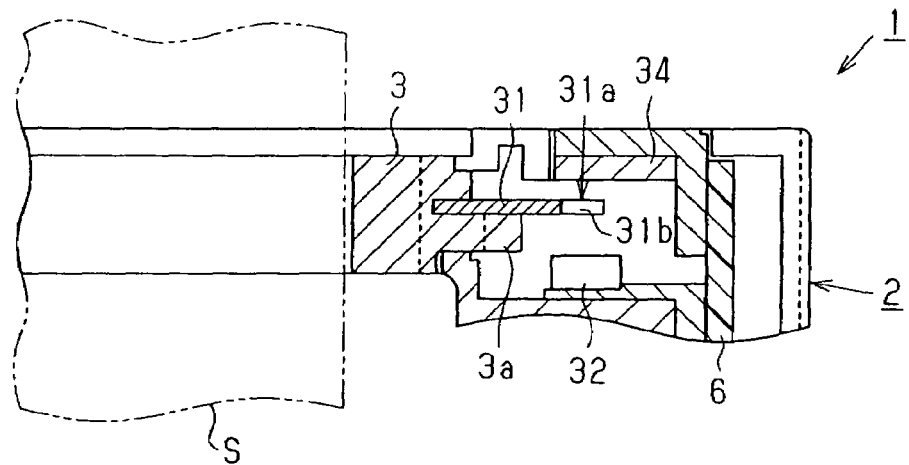
FIG. 9 is a partial cross sectional view taken along line 9—9 in FIG. 8.
Figure 10:
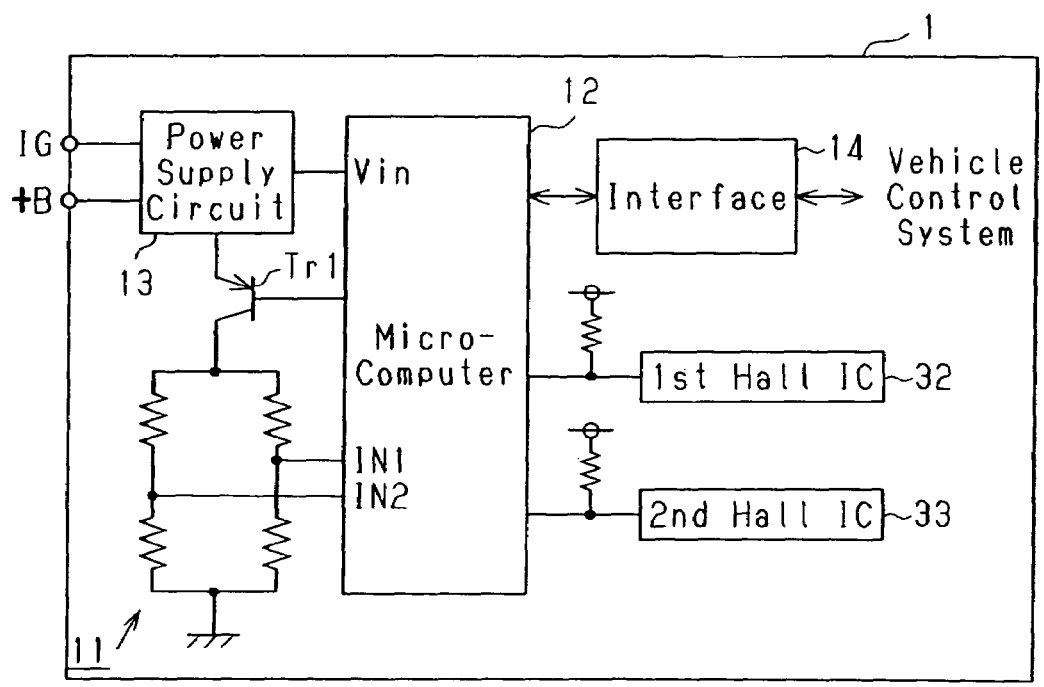
FIG. 10 is a block diagram of the steering angle detection apparatus of FIG. 8.

As shown in FIG. 8, the steering angle detection apparatus 1 of the third embodiment includes a magnetic shield plate 31, which is fixed to the rotation plate 3, and two Hall integrated circuits (first Hall IC 32 and second Hall IC 33), which function as supplemental detection elements. When the steering shaft S rotates, the magnetic shield plate 31 also rotates in conjunction with the rotation of the rotation plate 3. As shown in FIG. 9, the diameter of the magnetic shield plate 31 is larger than the diameter of the gear 3a of the rotation plate 3. Shield portions 31a and non-shield portions 31b are arranged along the entire circumference of the exterior surface of the magnetic shield plate 31 at equal intervals. For example, the angle θ1 formed between lines extending from the rotating axis of the magnetic shield plate 31 to adjacent shield portions 31a, or adjacent non-shield portions 31b, is 9 degrees.

As shown in FIGS. 8 and 9, the first Hall IC 32 and the second Hall IC 33 faces toward the shield portion 31a and the non-shield portion 31b below the magnetic shield plate 31 in the housing 2. The angle θ2 between a line connecting the rotating axis of the shield plate 31 and the center of the first Hall IC 32 and a line connecting the rotating axis of the magnetic shield plate 31 and the second Hall IC 33, is 1.5 times the angle θ1, which is 13.5 degrees in the third embodiment.

Figure 11:
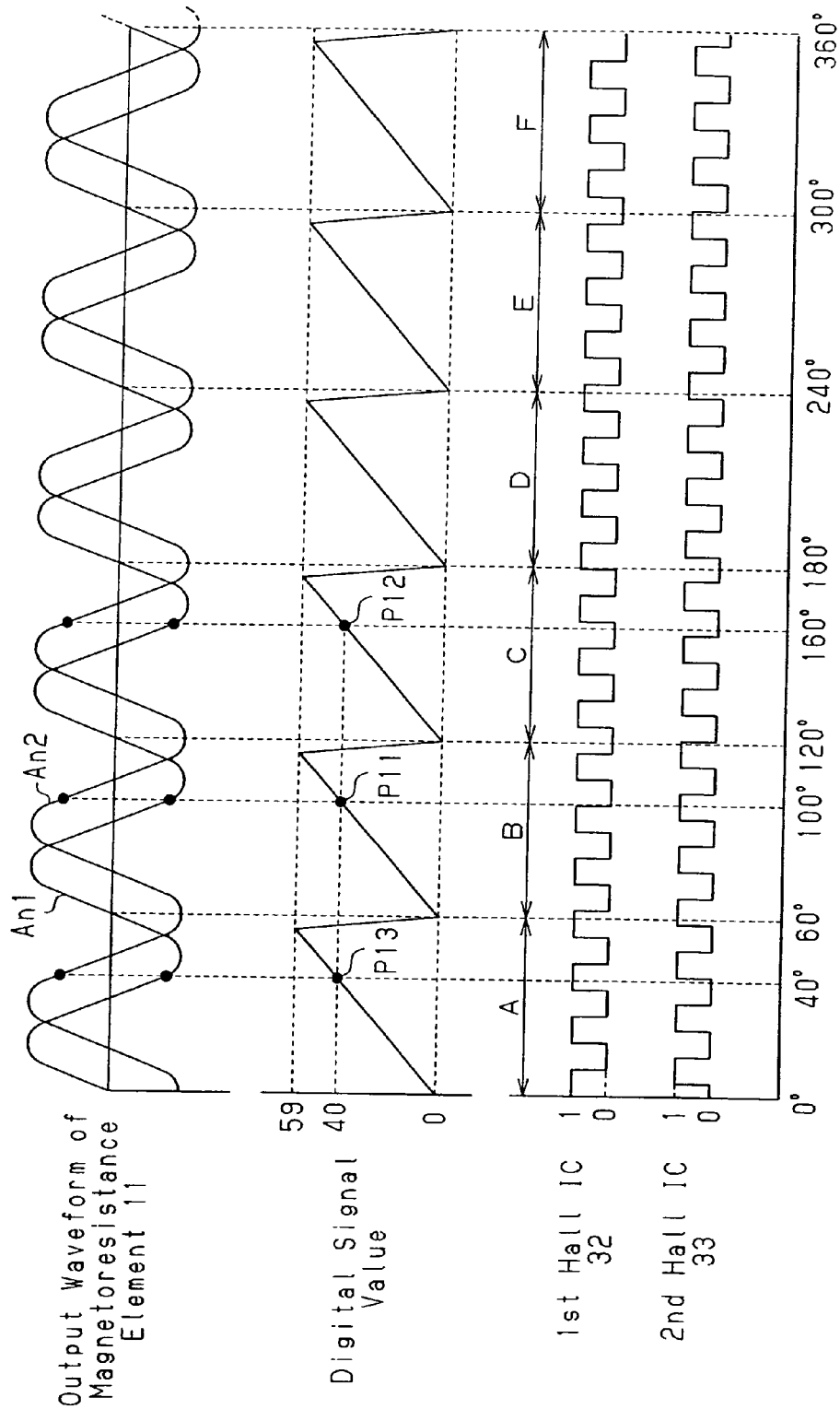
FIG. 11 is a graph showing the detection signal and detection angle of the steering angle detection apparatus of FIG. 8.
Figure 12:
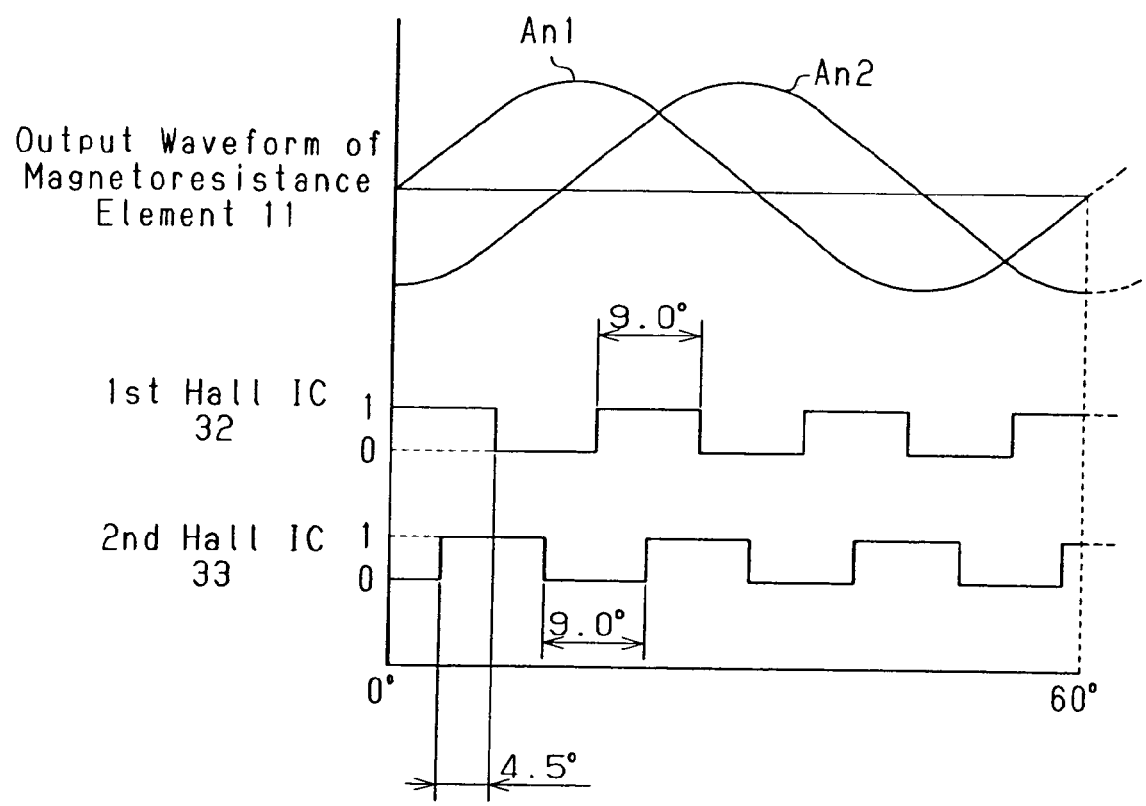
FIG. 12 is an enlarged view of range A in the graph of FIG. 11.

As shown in FIG. 9, a permanent magnet 34 is arranged above the magnetic shield plate 31 in the housing 2 facing towards the first and second Hall ICs 32 and 33. As shown in FIG. 11, each Hall IC 32 and 33 outputs a low (L) level signal ("0" in binary values) when the shield portion 31a of the shield plate 31 is located between the Hall IC 32 and 33 and the permanent magnet 34 (when the magnetic force of the permanent magnet 34 is blocked) and outputs a high (H) level signal ("1" in binary values) when the non-shield portion 31b is located between the Hall ICs 32 and 33 and the permanent magnet 34 (when the magnetic force of the permanent magnet is not blocked). Therefore, as shown in FIG. 12, when the magnetic shield plate 31 is rotated in conjunction with the rotation of the steering shaft S, the first and second Hall ICs 32 and 33 output pulse signals of which phases are shifted from each other by ¼ of a cycle. Each time the steering shaft S rotates 4.5 degrees, the level of the signal output from the first Hall IC 32 or the second Hall IC 33 changes. Specifically, when the output signals of the first and second Hall ICs 32 and 33 are expressed as two-bit binary signals, the binary signals are reflected binary codes which change in the pattern 10, 11, 01, 00, 10, 11 . . . . Thus, the first and second Hall ICs 32 and 33 provide the microcomputer 12 with reflected binary codes that change in conjunction with the rotation of the steering shaft S.

The microcomputer 12 receives the first and second analog signals An1 and An2 from the magnetoresistance element 11 and converts the analog signals An1 and An2 to a digital signal. The microcomputer 12 calculates the rotation angle of the rotation plate 3 based on the value of the digital signal, the number of cycles of the first and second analog signals An1 and An2 from the reference position, and the code pattern (reflected binary code) of the output signals of the first and second Hall ICs 32 and 33.

For example, when the rotation plate 3 is at a position rotated 100 degrees in the clockwise direction from the reference position (point P11 in FIG. 11), the digital signal value is "40". Furthermore, at this moment, the output signal of the first Hall IC 32 is "0", and the output signal of the second Hall IC 33 is "1". Then, when the rotation plate 3 further rotates 60 degrees in the clockwise direction (point P12), the digital signal value is also "40". However, at point P12, the output signal of the first Hall IC 32 is "0", and the output signal from the second Hall IC 33 is "0". That is, when comparing point P11 and point P12, the digital signal values are identical, but the code pattern of the output signals from the first and second Hall ICs 32 and 33 are different. Therefore, the microcomputer 12 detects that the steering shaft S has rotated 60 degrees in the clockwise direction from point P11 and is located 160 degrees from the reference position based on the digital signal values and the code pattern of the output signals from the first and second Hall ICs 32 and 33.

In contrast, at point P13 where the rotation plate 3 has rotated 60 degrees in the counterclockwise direction from the state shown at point P11, the digital signal values is again "40". At point P13, the output signal from the first Hall IC 32 is "1", and the output signal from the second Hall IC 33 is "0". That is, when comparing the state of point P13 and the states of points P11 and P12, the digital signal values are identical, but the code patterns of the output signals from the first and second Hall ICs 32 and 33 are different. The microcomputer 12 detects that the steering shaft S has rotated 60 degrees in the counterclockwise direction from point P11 and is located 40 degrees from the reference position based on the digital signal values and the code pattern of the output signals from the first and second Hall ICs 32 and 33.

That is, the output signal (reflected binary code) of the first and second Hall ICs 32 and 33 changes each time the steering shaft S and the rotation plate 3 rotate 4.5 degrees. Therefore, before the steering shaft S rotates 180 degrees, identical digital signal values have different corresponding code patterns produced by the output signals of the first and second Hall ICs 32 and 33. This enables the microcomputer 12 to determine the absolute rotation angle of the steering shaft S within a range in which the steering shaft S rotates 180 degrees. In other words, the first and second Hall ICs 32 and 33 are set to output a binary signal that changes such that the code pattern corresponding to a predetermined output value in the present cycle of the first and-second analog signals An1 and An2 is different from the code pattern corresponding to the same output value in the cycles immediately before and immediately after that code pattern.

Therefore, when the engine is stopped, the microcomputer 12 intermittently operates the transistor Tr1 with a timing (sampling cycle) in which the magnetoresistance element 11 is operated only once before the rotation angle of the rotation plate 3 changes 90 degrees when the rotation plate 3 is rotated at maximum rotation speed (five rotations per second). That is, the microcomputer 12 detects whether the rotation plate 3 has rotated in the clockwise direction or the counterclockwise direction based on the change in the digital signal value and the code pattern from the Hall ICs 32 and 33 associated with the digital signal value. Thus, the sampling cycle for operating the magnetoresistance element 11 satisfies (sampling cycle)<90÷1800=0.05. That is, the sampling cycle may be set at less than approximately 50 milliseconds.

In addition to advantages (1) through (5), the third embodiment has the advantages described below.

(6) Even when the output values of the first and second analog signals An1 and An2 are identical, the code patterns of the output signals from the first and second Hall ICs 32 and 33 are different. The rotation angle of the steering shaft S is calculated as an absolute angle in the immediately previous cycle, the current cycle, and the immediately following cycle from the output values of the first and second analog signals An1 and An2 and the code patterns of the Hall ICs 32 and 33. That is, the rotation angles in three cycles of the output values of the first and second analog signals An1 and An2 are calculated as absolute angles. In this way, when the steering angle detection apparatus 1 is non-activated, erroneous angle detection is prevented by calculating the rotation angle at least once before the steering shaft S is rotated 90 degrees when the steering shaft S is rotated at a predetermined maximum rotation speed. That is, the cycle of the intermittent sampling operation during non-activation of the steering angle detection apparatus 1 may be lengthened, and the power consumption of the steering angle detection apparatus 1 resulting from the sampling operation is significantly reduced.

(7) Abnormality of the magnetoresistance element 11 and the two Hall ICs 32 and 33 may be detected by comparing the first and second analog signals An1 and An2 from the magnetoresistance element 11 with the output signals of the first and second Hall ICs 32 and 33. For example, it is possible to determine if abnormal operation occurs in the first and second Hall ICs 32 and 33 when there is no change in the code pattern of the output signals from the first and second Hall ICs 32 and 33 in spite of a change in the output values of the first and second analog signals An1 and An2. Furthermore, it is possible to determine if there is an abnormality in the magnetoresistance element 11 when there is no change in the output values of the first and second analog signals An1 and An2 in spite of a change in the code pattern of the output signals from the first and second Hall ICs 32 and 33.

It should be apparent to those skilled in the art that the present invention may be embodied in many other specific forms without departing from the spirit or scope of the invention. Particularly, it should be understood that the present invention may be embodied in the following forms.

In the second embodiment, the first and second analog signals An1 and An2 output from the angle detection MRE (magnetoresistance element) 11 and the third and fourth analog signals An3 and An4 output from the abnormality detection MRE 23 need not have the same phase. Furthermore, the first and second analog signals An1 and An2 and the third and fourth analog signals An3 and An4 need not have the same cycle.

In each embodiment, various types of magnetic sensors, such as a giant magnetoresistance element (GMR element), a magnetic impedance element, or a Hall element, and contact-type elements, such as a potentiometer, may be used in lieu of the magnetoresistance element 11.

In the second embodiment, various types of magnetic sensors may be used to replace the abnormality detection MRE 23.

In the third embodiment, the first and second Hall ICs 32 and 33 output signals so as to not overlap the code pattern associated with the same digital signal value within three consecutive cycles of the first and second analog signals An1 and An2. However, the first and second Hall ICs 32 and 33 also may output signals so as to not overlap the code pattern associated with the same digital signal value within a range of four or more consecutive cycles of the first and second analog signals An1 and An2.

In the third embodiment, three or more Hall ICs may be used.

In the third embodiment, photosensors may replace the Hall ICs 32 and 33.

In the third embodiment, the angle θ2 between the first and second Hall ICs 32 and 33 may be freely set insofar as the code pattern of the output signals of the first and second Hall ICs 32 and 33 associated with the same digital signal value is not overlapped within three consecutive cycles of the first and second analog signals An1 and An2.

In each embodiment, the rotation angle of the rotation plate 3 in one cycle of the first through fourth analog signals An1 through An4 is not limited to 60 degrees, and may be modified to an optional angle, such as, for example, 90, 120, 180, 360, 720, or 1800 degrees.

The steering angle detection apparatus 1 of the second embodiment may be provided with the first and second Hall ICs 32 and 33 of the third embodiment, so as to form a steering angle detection apparatus 1 which combines the second and third embodiments. In this case, abnormalities of the angle detection MRE (magnetoresistance element) 11, abnormality detection MRE 23, and first and second Hall ICs 32 and 33 may be detected by comparing the output signals of the angle detection MRE 11, abnormality detection MRE 23, and first and second Hall ICs 32 and 33. Then, when, for example, an abnormality occurs in the angle detection MRE 11 or the abnormality detection MRE 23, the angle may be calculated using the properly operating MRE 11 or MRE 23. Furthermore, when an abnormality occurs in the first and second Hall ICs 32 and 33, the abnormality detection operation of the angle detection MRE 11 (similar to the second embodiment) may be performed by the abnormality detection MRE 23.

In addition to use as the steering angle detection apparatus 1 for detecting the rotation angle of a steering shaft, the rotation angle detection apparatus may also be used, for example, as a rotation angle detection apparatus for detecting the rotation angle of a rotating shaft in machine tools provided with a rotating shaft. Furthermore, when used as a rotation angle detection apparatus for detecting the rotation angle of a rotational body which rotates only in one direction (e.g., in a clockwise direction), if the rotation angle detection apparatus is non-activated, the microcomputer 12 may calculate the rotation angle of the rotational body in sampling cycles differing from those of the above described embodiments. Specifically, the microcomputer 12 may calculate the rotation angle of a rotational body once in a sampling cycle before the first and second analog signals An1 and An2 change cycles when the rotational body is rotated at a maximum rotational speed. In this case, the sampling cycle may be lengthened, and the power consumption of the rotation angle detection apparatus is significantly reduced.

The present examples and embodiments are to be considered as illustrative and not restrictive, and the invention is not to be limited to the details given herein, but may be modified within the scope and equivalence of the appended claims.

What is claimed is:

1. An apparatus for detecting the rotation angle of a rotational body comprising:
    an angle detecting element for generating angle detection analog signals each having an output value that cyclically and continuously changes in accordance with the rotation angle of the rotational body, wherein one cycle of each angle detection analog signal is associated with a predetermined degree of rotation of the rotational body;
    an angle determining unit, connected to the angle detecting element, for generating a digital signal having a digital value from the angle detection analog signals and determining the rotation angle of the rotational body based on the digital value of the digital signal and the output values and a number of cycles of the angle detection analog signals; and
    an abnormality detecting element for generating an abnormality detection analog signal having an output value that cyclically and continuously changes in accordance with the rotation angle of the rotational body;
    wherein one cycle of the angle detection analog signal is associated with the predetermined degree of rotation of the rotational body; and the angle determining unit determines abnormal functioning of the angle detecting element and the abnormality detecting element by comparing the output value of the angle detection analog signal and the output value of the abnormality detection element so as to check whether the two output value correspond to a predetermined relationship.

2. The apparatus of claim 1, wherein the angle calculation unit controls the angle detecting element such that the angle detecting element intermittently functions with a sampling cycle set at a length sufficient for determining the rotation angle of the rotational body at least once within a period required for the rotational body to be rotated by the predetermined angle at a predetermined maximum rotation speed when the detection apparatus is non-activated.

3. The apparatus of claim 1, wherein the rotational body is a steering wheel of a vehicle.

4. The apparatus of claim 1, further comprising:
    a supplemental detection element for generating a binary signal configuring a reflected binary code that changes in conjunction with the change in the rotation angle of the rotational body;
    wherein one output value of the current cycle of the angle detection analog signal is identical to one output value in each of immediately previous and immediately following cycles of the angle detection analog signal; and the reflected binary code associated with said one output value in the current cycle of the angle detection analog signal differs from the reflected binary code associated with said one output value in the immediately previous cycle and the immediately following cycle of the angle detection analog signal.

5. The apparatus of claim 2, wherein the maximum rotation speed is a speed at which the rotational body rotates at five rotations per second.

6. The apparatus of claim 1, wherein one cycle of the abnormality detection analog signal is the same as one cycle of the angle detection analog signal.

7. The apparatus of claim 4, wherein the supplemental detection element includes at least two Hall elements, each of which generates a one bit binary signal, and the reflected binary code has at least two bits.

8. The apparatus of claim 1, wherein the angle detection element includes a magnetoresistance element or a magnetic impedance element.

9. An apparatus for detecting the rotation angle of a rotational body comprising the steering wheel of a vehicle having a battery and an engine, the apparatus comprising:
    a rotation plate rotated together with the rotational body and including a gear;
    a first gear body meshed with the gear of the rotation plate and rotated in conjunction with the rotation of the rotation plate, wherein the first gear body has a number of teeth that is determined such that the first gear body is rotated a predetermined natural number of times during a single rotation of the rotation plate;
    a magnetoresistance element for generating angle detection analog signals each having an output value that changes cyclically in accordance with the rotation angle of the first gear body;
    a microcomputer for generating a digital signal having a digital value from the angle detection analog signals, detecting the number of rotations of the first gear body from the cyclic change in the angle detection analog signals, detecting the rotation angle of the first gear body from the digital value of the digital signal and the output values of the angle detection analog signals, and determining the rotation angle of the rotational body from the detected rotation angle and the detected number of rotations of the first gear body;
    a magnetic generation element rotated integrally with the first gear body, the magnetoresistance element detecting magnetism of the magnetic generation element and generating an angle detection analog signal;
    a power supply circuit, connected to the battery, for supplying power to the microcomputer;
    a switching device arranged between the power supply circuit and the magnetoresistance element and controlled by the microcomputer, the microcomputer keeping the switching device ON to continuously activates the magnetoresistance element when the vehicle is active, and the microcomputer intermittently turning ON the switching device to activate the magnetoresistance element with a predetermined sampling cycle when the engine is stopped;
    a second gear body meshed with the rotation plate and rotated in conjunction with the rotation of the rotation plate, the number of teeth of the second gear body being the same as the number of teeth of the first gear body;
    a permanent magnet rotated integrally with the second gear body; and an abnormality detection element for detecting the magnetism of the permanent magnet and generating an abnormality detection analog signal having an output value that changes cyclically and continuously in accordance with the rotation angle of the rotational body;

wherein the microcomputer determines that the angle detection element and the abnormality detection element are abnormal when the cyclic change of the abnormality detection analog signal does not correspond to the cyclic change of the angle detection analog signal.

10. The apparatus of claim 9, wherein the predetermined sampling cycle is determined so as to have a length sufficient for the magnetoresistance element to detect the magnetism of the magnetic generation element at least once within a period required for the rotational body to rotate an amount corresponding to the predetermined angle at a predetermined maximum rotation speed.

11. The apparatus of claim 9, further comprising:
a supplemental detection element for generating a binary signal configuring a reflected binary code that changes in conjunction with the change in the rotation angle of the rotational body, the microcomputer calculating the rotation angle of the rotational body from the reflected binary code and the rotation angle of the first gear body.

12. The apparatus of claim 9, wherein the angle detection analog signal includes a first sine wave analog signal, which changes in accordance with the rotation angle of the rotational body, and a second sine wave analog signal, which has a phase difference of ¼ of a cycle from the first sine wave analog signal.

13. The apparatus of claim 9, wherein the abnormality detection analog signal includes a third sine wave analog signal, which changes in accordance with the rotation angle of the rotational body, and a fourth sine wave analog signal, which has a phase difference of ¼ of a cycle from the third sine wave analog signal.

* * * * *